United States Patent [19]

Udagawa

[11] Patent Number: 4,908,701
[45] Date of Patent: Mar. 13, 1990

[54] COLOR IMAGE PROCESSING METHOD AND APPARATUS FOR COLOR ADJUSTMENT DURING IMAGE PROCESSING

[75] Inventor: Yoshiro Udagawa, Tokyo, Japan

[73] Assignee: Canon Kabushiki Kaisha, Tokyo, Japan

[21] Appl. No.: 164,413

[22] Filed: Mar. 4, 1988

[30] Foreign Application Priority Data

Mar. 9, 1987 [JP] Japan .................. 62-54465
Mar. 27, 1987 [JP] Japan .................. 62-71397

[51] Int. Cl.⁴ .................................... G03F 3/00
[52] U.S. Cl. .......................... 358/80; 358/75
[58] Field of Search ..................... 358/80, 75

[56] References Cited

U.S. PATENT DOCUMENTS

| | | | |
|---|---|---|---|
| 3,462,546 | 8/1969 | Keller | 358/80 |
| 3,600,505 | 8/1971 | Dobouney | 358/80 |
| 3,629,490 | 12/1971 | Keller | 358/80 |
| 4,096,519 | 6/1978 | Hoffrichter et al. | 358/80 X |
| 4,263,001 | 4/1981 | Deutsch | 358/80 X |
| 4,293,872 | 10/1981 | Keller et al. | 358/80 X |
| 4,402,015 | 8/1983 | Yamada | 358/80 X |
| 4,410,909 | 10/1983 | Ueda et al. | 358/80 X |
| 4,418,358 | 11/1983 | Poetsch et al. | 358/80 |
| 4,468,692 | 8/1984 | Yamada | 358/80 X |
| 4,481,532 | 11/1984 | Clark et al. | 358/80 |
| 4,639,769 | 1/1987 | Fleisher et al. | 358/80 X |
| 4,646,252 | 2/1987 | Terashita | 358/80 X |
| 4,707,727 | 11/1987 | Penney | 358/80 X |
| 4,734,763 | 3/1988 | Urabe et al. | 358/80 |
| 4,745,465 | 5/1988 | Kwon | 358/80 |
| 4,745,467 | 5/1988 | Seleizawa et al. | 358/80 |

FOREIGN PATENT DOCUMENTS

| | | | |
|---|---|---|---|
| 208919 | 1/1987 | European Pat. Off. | 358/75 |
| 56-51742 | 5/1981 | Japan | 358/80 |
| 60-37878 | 2/1985 | Japan | 358/75 |
| 60-216353 | 10/1985 | Japan | 358/80 |
| 62-51557 | 10/1987 | Japan . | |

Primary Examiner—James J. Groody
Assistant Examiner—Mark R. Powell
Attorney, Agent, or Firm—Fitzpatrick, Cella, Harper & Scinto

[57] ABSTRACT

In a color image processing method, a dark point in a given color image is detected, a color component of the detected dark point is then detected, and a color component other than that of the dark point is corrected in accordance with the detected color component.

28 Claims, 7 Drawing Sheets

COLOR IMAGE PROCESSING METHOD AND APPARATUS FOR COLOR ADJUSTMENT DURING IMAGE PROCESSING

BACKGROUND OF THE INVENTION

1. Field of the Invention

This invention relates to color image processing apparatus.

2. Related Background Art

When color adjustment is performed in a conventional printer, the individual quantities of cyan, magenta and yellow inks are adjusted and the entire gamma characteristic is manually altered. Therefore, when a shift in the color temperature correction caused during image pickup is eliminated, it takes much time for that adjustment and it may be impossible to perform that adjustment when occasion demands.

SUMMARY OF THE INVENTION

It is an object of this invention to provide a color image processing method and apparatus which solves the above noted problems.

It is another object of this invention to provide a color image processing method and apparatus which is capable of appropriately correcting a shift in the color temperature correction caused in a given color image.

It is a further object of this invention to provide a color image processing method and apparatus which is capable of appropriately correcting the color of a given color image using a simple structure.

Under these objects, a preferred embodiment of this invention discloses a color image processing apparatus comprising:

means for providing the values of color difference signals on a highlight point in a predetermined color image and on a dark point in the color image;

means for calculating a correction quantity to the color difference signals corresponding to the respective luminance values of the highlight and dark points on the basis of the value of the color difference signal on the highlight point and the value of the color difference signal on the dark point;

means for converting the two corrected color difference signals into a hue signal and a saturation signal; and conversion means for outputting C, M and Y signals on the basis of a luminance signal, the color difference signals and the saturation signal.

It is a still further object of this invention to provide a color image processing method and apparatus which is capable of manually correcting the color of a color image appropriately and simply.

Under such object, a preferred embodiment of this invention discloses a color recording apparatus for performing color recording on the basis of three input primary color signals comprising: means for generating a luminance signal and two color signals; a correction circuit for applying a quantity of shift to the generated color signals; means for generating from the luminance signal and color signals three primary color signals suitable for a color dissolving system of a recording means; and means for receiving one correction value to correct the color difference signals whereby correction to the two color signal is controlled by the correction value.

Other objects and features of this invention will be apparent from the description of embodiments thereof to be described below and the drawings.

DETAILED DESCRIPTION OF THE PREFERRED EMBODIMENTS

Figure 1:
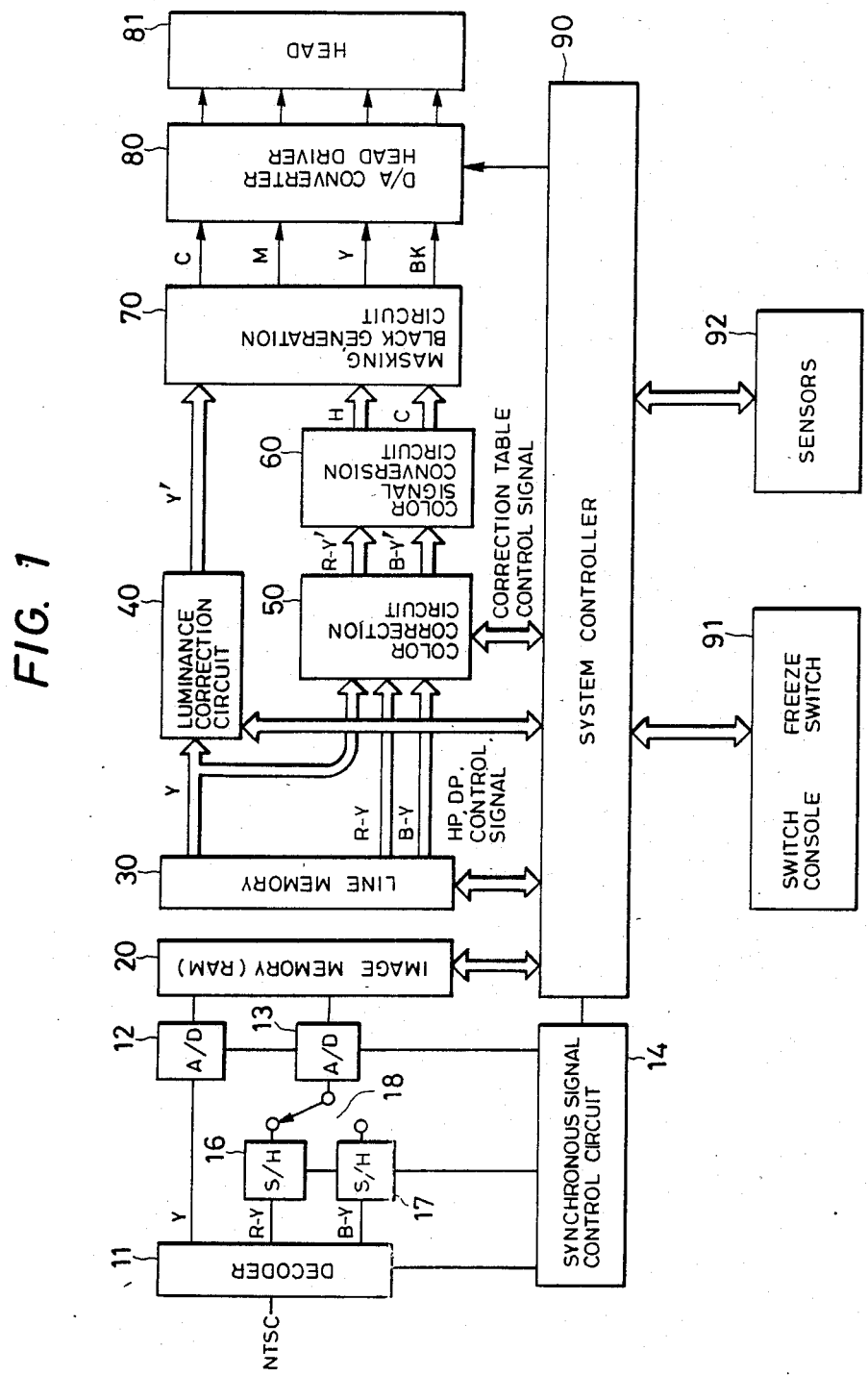
FIG. 1 is a block diagram showing one embodiment of this invention.

FIG. 1 is a block diagram showing one embodiment of this invention.

This embodiment is concerned with a video printer with an image memory to which the color image processing method according to this invention is applied.

This embodiment includes decoder 11; A/D converters 12, 13; synchronous signal control circuit 14, sample and hold circuits 16 and 17, switching circuit 18 which switches between the outputs from the sample and hold circuits for each line to A/D converter 13; image memory 20; line memory 30; luminance correction circuit 40; color correction circuit 50; color signal conversion circuit 60; masking, black generation circuit 70; D/A converter and head driver 80; head 81; system controller 90; switch console 91; and sensors 92.

Color correction circuit 50 is an example of means for providing the value of a color difference signal on a highlight point in a predetermined color image and the value of a color difference signal on a dark point in the color image, and also an example of means for calculating a quantity of correction. This calculating means calculates a quantity of correction to the color difference signals corresponding to the luminance value on the basis of the value of the color difference signal on the highlight point and the value of the color difference signal on the dark point.

Color signal conversion circuit 60 is an example of a color signal conversion means which converts the two color difference signals, corrected as described above, to a hue signal and a saturation signal. Masking, black generation circuit 70 is an example of a conversion means which outputs C, M and Y signals (an additional BK signal, if necessary) on the basis of the luminance signal, color difference signals, and saturation signal.

The operation of the embodiment will now be described. First, an input NTSC video signal is demodulated via decoder 11 into luminance signal Y and two color difference signals R - Y and B - Y. The luminance signal Y is converted by A/D converter 12 to a digital signal which is then stored in image memory 20. Color difference signals R - Y and B - Y are selected sequentially for each line, subjected to A/D conversion and then stored in image memory 20. The above operation is performed by switching on a freeze switch provided on switch console 91, using synchronous-signal control circuit 14.

The print operation will now be described.

First, when a printing switch (not shown) on switch console 91 is turned on, image data in image memory 20 is read out and printing is started on the basis of the read image data.

More specifically, the luminance signal Y for one line of data is read out of image memory 20 and stored in line memory 30. Color difference signals R - Y, B - Y are sequentially recorded for each line, so that the data on image portions not scanned are supplemented and the thus supplemented data for one line is written into line memory 30. In that case, the same data as the data just above or below the place where supplement is to be performed may be used (so-called reuse may be made) without performing interpolation.

The luminance signal Y is corrected by luminance correction circuit 40 into a luminance signal Y'. Color difference signals R - Y, B - Y are corrected by color correction circuit 50 which provides corrected color difference signals R - Y', B - Y' which are then converted by color signal conversion circuit 60 to a hue signal H and a saturation signal C.

Masking, black generation circuit 70 performs calculations for correcting unequal color components of ink on the basis of luminance signal Y', hue signal H and saturation signal C, converts these signals to C, M and Y (cyan, magenta and yellow) signals and outputs as a BK (black) signal the minimum of the C, M and Y signals. These signals are input to D/A converter and head driver 80, which outputs drive pulse-waveform signals which then drive head 81 to thereby perform printing.

Figure 2:
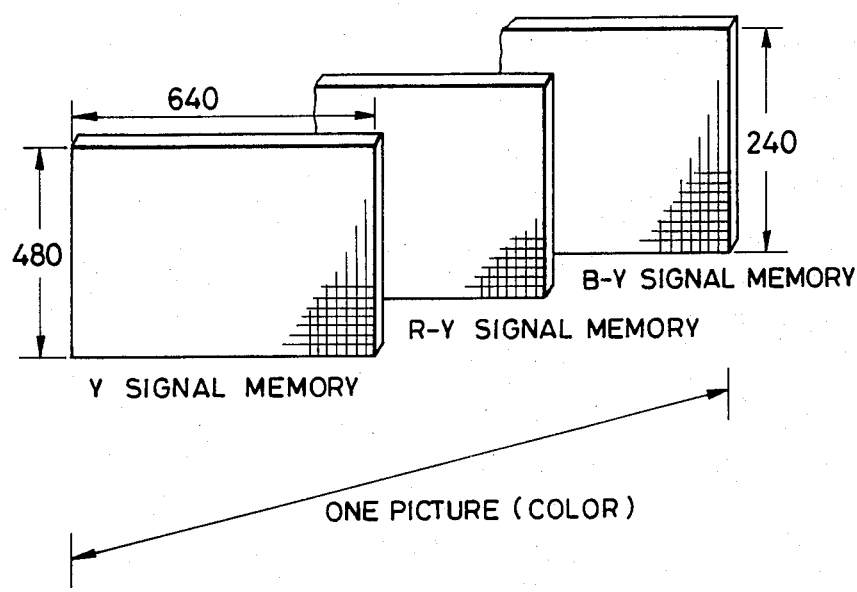
FIG. 2 illustrates one example of an image memory in the embodiment.

The operation of color correction circuit 50 will now be described. As shown in FIG. 2, assume that image memory 20 is composed of 480×640 pixels. By scanning a picture, luminance data on twenty brighter pixels (highlight points) in a picture are selected and color difference data on these pixels are found sequentially from the pixel luminance data. Similarly, luminance data on twenty darker pixels (dark points) are selected and color difference data on those pixels found sequentially.

Generally, for an image in which the white balance is lost (namely, color reproduction is incorrect), the value of the pixel color difference can adjustably be corrected to thereby correct incorrect color reproduction. A quantity of correction is determined on the basis of the quantity of the color difference on a pixel which is considered to be white in the picture or the quantity of color difference on a pixel which is considered to be black. Since it is difficult to actually find white or black accurately in the picture, the brightest luminance point and the darkest luminance point are regarded to be white and black, respectively, in the picture.

If the brightest value and the darkest value are employed as they are, there is a high probability that noise and dropout may be wrongly determined as white and black, respectively. In order to cope with this, several points are sampled from each of the respective groups of highlight points (brighter values in the picture) and dark points (darker values in the picture). For example, if the pixels are 480×640, twenty pixels are sampled from each of highlight and dark points.

The respective average values of the color difference signals R - Y, B - Y on the twenty brighter pixels are then calculated. The average value of the color difference signals R - Y on the twenty highlight point pixels is represented by $\Delta RY(HP)$, the average value of the color difference signals B - Y on the twenty highlight point pixels by $\Delta BY(HP)$, the average value of the color difference signals R - Y on the twenty dark point pixels by $\Delta RY(DP)$, and the average value of the color difference signals B - Y on the twenty dark point pixels by $\Delta BY(DP)$.

Correction quantities $\Delta RY(Y)$, $\Delta BY(Y)$ to a luminance value Y between the highlight point luminance value $Y(HP)$ and the dark point luminance value $Y(DP)$ may be obtained by the weighted means of the respective differences between the corresponding highlight point luminance value $Y(HP)$ and dark point luminance values $Y(DP)$. $\Delta RY(Y)$ is a correction quantity to the color difference signal R - Y while $\Delta BY(\Delta Y)$ is a correction quantity to the color signal B - Y as follows:

$$\Delta RY(Y) = [\Delta RY(DP)\{Y(HP) - Y\} + \quad (A)$$
$$\Delta RY(HP)\{Y - Y(DP)\}]/\{Y(HP) - Y(DP)\}$$
$$\Delta BY(Y) = [\Delta BY(DP)\{Y(HP) - Y\} + \quad (B)$$
$$\Delta BY(HP)\{Y - Y(DP)\}]/\{Y(HP) - Y(DP)\}$$

These calculations are performed on all the luminance signal values (0-255). For luminance values higher than the average value $Y(HP)$ of the highlight point luminance values, $\Delta RY(HP)$, $\Delta BY(HP)$ may be correction quantities thereto while for luminance signal values lower than the average value $Y(DP)$ of the dark point luminance values, $\Delta RY(DP)$, $\Delta BY(DP)$ may be set as correction quantities thereto.

Figure 6:
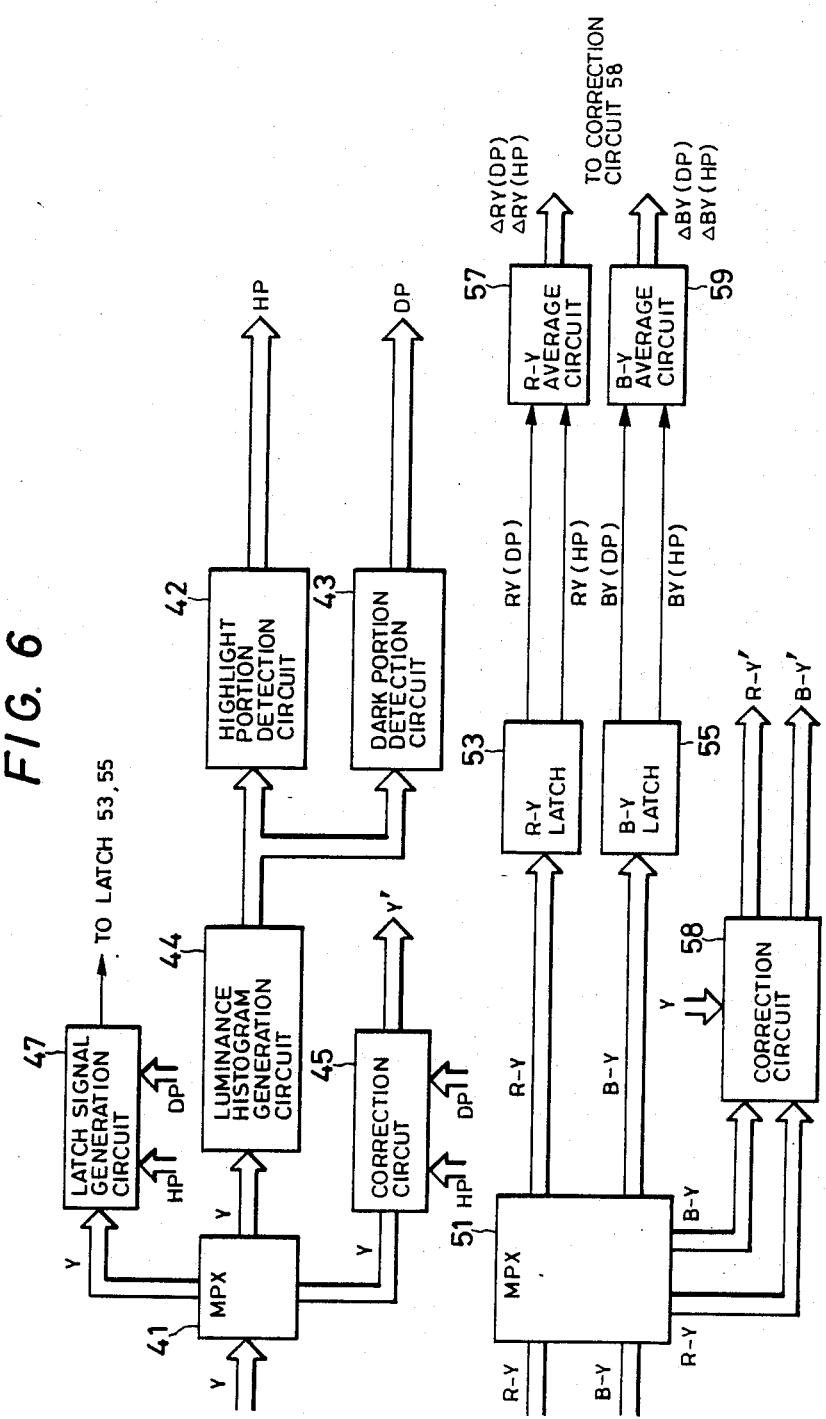
FIG. 6 is a block diagram showing the internal structure of luminance and color correction circuits of FIG. 1.

The operation of luminance correction circuit 40 and color correction circuit 50 is as described above and the internal structure of both the circuits will now be described in detail using FIG. 6 in which multiplexer 41 receives a luminance signal, selects luminance histogram generation circuit 44, latch signal generation circuit 47 or correction circuit 45 and outputs the luminance signal to the selected one. Luminance histogram generation circuit 44 forms a distribution histogram of input luminance values. Highlight portion detection circuit 42 detects the average value HP on twenty brighter pixels from the histogram formed by the luminance histogram generation circuit. Dark portion detection circuit 43 detects the average value DP on twenty darker pixels in contrast with the circuit 42. Correction circuit 45 performs the following correction to the luminance signal Y output from multiplexer 41:

$$Y' = Y_{MIN} + \frac{Y_{MAX} - Y_{MIN}}{Y_{HP} - Y_{DP}}(Y - Y_{DP}) \quad (C)$$

where $Y_{MAX}$ is the maximum luminance in a range of luminances reproducible by a printer including head 81, and $Y_{MIN}$ is the minimum luminance.

Latch signal generation circuit 47 compares an input luminance signal Y with each of HP, DP and outputs a latch control signal to latches 53 and 55 to be described later in more detail. Multiplexer 51 switches between latches 53, 55 and color difference correction circuit 58 to provide color difference signals R - Y, B - Y to the selected one(s). Latches 53 and 55 latch the highlight and dark color difference signals and output the same in accordance with a latch signal generated by latch signal generation circuit 47. Each time data is latched by latches 53 and 55, R - Y and B - Y average circuits 57 and 59 add and average the latched data and output ΔRY(HP), ΔRY(DP), ΔBY(HP) and ΔBY(DP). Correction circuit 58 determines color difference signals output from multiplexer 51 in accordance with the formulas (A) and (B).

The operation of the above circuits will now be described. First, system controller 90 controls multiplexer 41 so as to output luminance signal Y to histogram generation circuit 44 and controls multiplexer 51 so as not to output color difference signals.

Under such conditions, controller 90 causes an image signal for one picture to be output to histogram generation circuit 44 and controls detection circuits 42 and 43 such that they calculate the luminances HP, DP of the highlight and dark light portions.

System controller 90 controls multiplexer 41 so as to output luminance signal Y to latch signal generation circuit 47 and controls multiplexer 51 so as to output color difference signals to latches 53 and 55. Under such conditions, controller 90 causes an image signal for one picture to be again output. Latches 53, 55 each latch data on 20 pixels of each of the dark and highlight portions in accordance with a signal indicative of a latch command from latch signal generation circuit 47, and average circuits 57, 59 average these corresponding pixel data.

System controller 90 causes multiplexer 41 to output a luminance signal to correction circuit 45, causes multiplexer 51 to output color difference signals to correction circuit 58 to perform the calculations on the formulas (A), (B), (C) and to correct the luminance signal and the color difference signals.

The relationship between a correction quantity to color difference signal R - Y and luminance signal Y will now be described.

Figure 4:
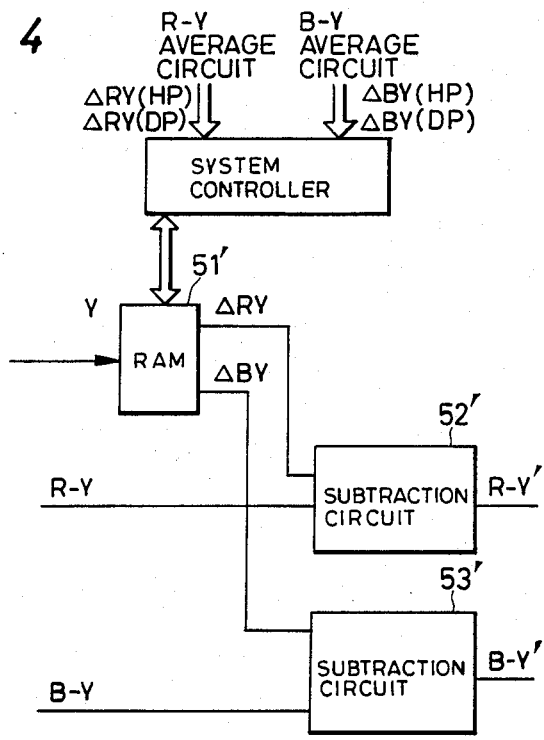
FIG. 4 is a block diagram showing a specific example of a color correction circuit in the embodiment.

FIG. 4 is a circuit diagram showing the internal structure of correction circuit 58 of color correction circuit 50 more specifically.

In FIG. 4, there are provided RAM 51', and subtractors 52', 53'. While in FIG. 4, ΔRY(HP), ΔRY(DP), ΔBY(HP), ΔBY(DP) are supplied to RAM 51' via system controller 90, they may directly be supplied to RAM 51' not via system controller 90.

Figure 5:
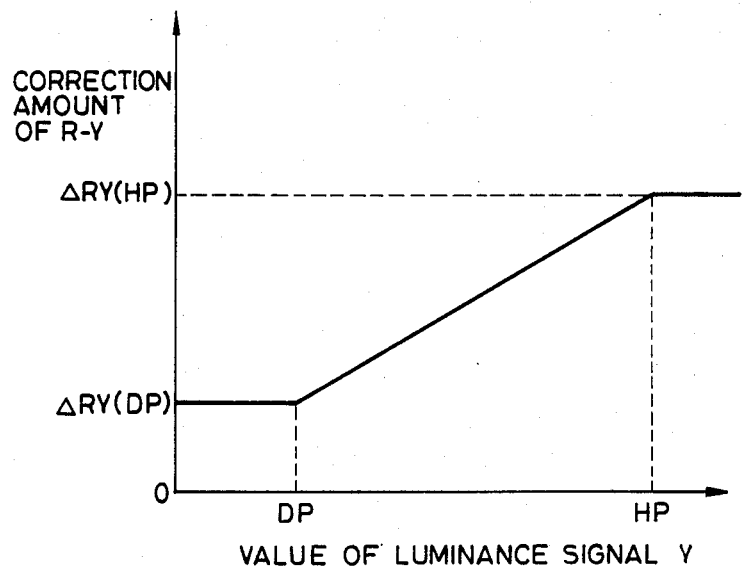
FIG. 5 illustrates one example of a characteristic from which a correction value of the color difference signal corresponding to the luminance signal is calculated.

RAM 51' is a memory into which correction quantities ΔRY, ΔBY to color difference signals R - Y and B - Y, respectively, are written in accordance with the value of luminance signal Y. Subtractor 52' subtracts correction quantity ΔRY from color difference signal R - Y while subtraction circuit 53' subtracts correction quantity ΔBY from color difference signal B - Y. Actually, subtraction circuit 52', 53' may be composed of a ROM. FIG. 5 shows a curve showing the characteristic of RAM 51'.

Again in FIG. 1, the operation of color signal conversion circuit 60 and circuits subsequent thereto will now be described. Color signal conversion circuit 60 outputs a hue signal H and a saturation signal C on the basis of correction quantities R - Y', B - Y' to the corresponding color difference signals. In this case, conversion circuit 60 is realized by the use of a table conversion ROM.

When conversion to hue and saturation signals H and C is performed on the basis of the corrected color difference signals R - Y', B - Y', the following formulas are used:

$$H = \tan^{-1}(R - Y', B - Y')$$

$$C = \{(R - Y')^2 + (B - Y')^2\}^{\frac{1}{2}}$$

Figure 3:
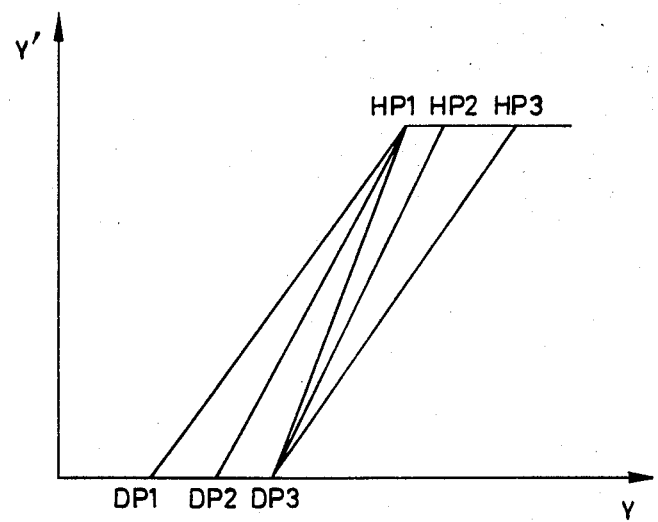
FIG. 3 illustrates an example of a conversion curve in a luminance correction circuit of the embodiment.

Luminance signal Y is input to luminance correction circuit 40 which may operate, as mentioned above in the particular embodiment. Alternatively, one of the conversion curves shown in FIG. 3 may be selected in accordance with the value of the highlight point (HP) and dark point (DP) obtained from the histogram. The luminance signal is processed on the basis of the selected conversion curve.

Masking, black generation circuit 70 converts the luminance signal Y', which is already converted with respect to gradation, hue signal H and saturation signal C to C, M, Y and BK signals in accordance with the following formulas:

$$(R - Y) = C \times \sin(H)$$

$$(B - Y) = C \times \cos(H)$$

$$R = (R - Y) + Y$$

$$B = (B - Y) + Y$$

$$G = (1/0.59)\{0.3 \times (R - Y) + 0.11 \times (B - Y)\} + Y$$

$$C = -\log(R/R0)$$

$$M = -\log(G/G0)$$

$$Y = -\log(B/B0)$$

$$BK = \text{Min}(C, M, Y)$$

where R0, G0, B0 are constants.

The results of the above calculations are stored in the table ROM corresponding to Y, H and C signals. When Y, H, C signals are input, the signals C, M, Y and BK signals are output. The thus obtained C, M, Y and BK signals are converted to the corresponding analog output signals which are then used to drive head 81 via head driver 80 to thereby perform printing.

Provided on switch console 91 is a switch (not shown) which switches to 0 the correction quantity calculated by the correction quantity calculating means. When this switch is turned off, the correction quantity to the color difference is switched to 0 irrespective of histogram information.

In the conventional apparatus, many sheets of printing paper were wasted in order to adjust the color balance, but such a waste is eliminated in this embodiment.

In this embodiment, when the respective averages on the highlight point and dark point are calculated, twenty pixels are sampled and averaged, but the number of samples may be other than 20.

According to the particular embodiment, good color reproduction can be performed reliably and rapidly when a mistake occurs in the color temperature setting in image pickup.

In this embodiment, a color shift occurring during image pickup was detected and automatically corrected on the basis of the result of the detection. An embodiment in which such color shift is easily corrected manually will now be described.

Figure 7:
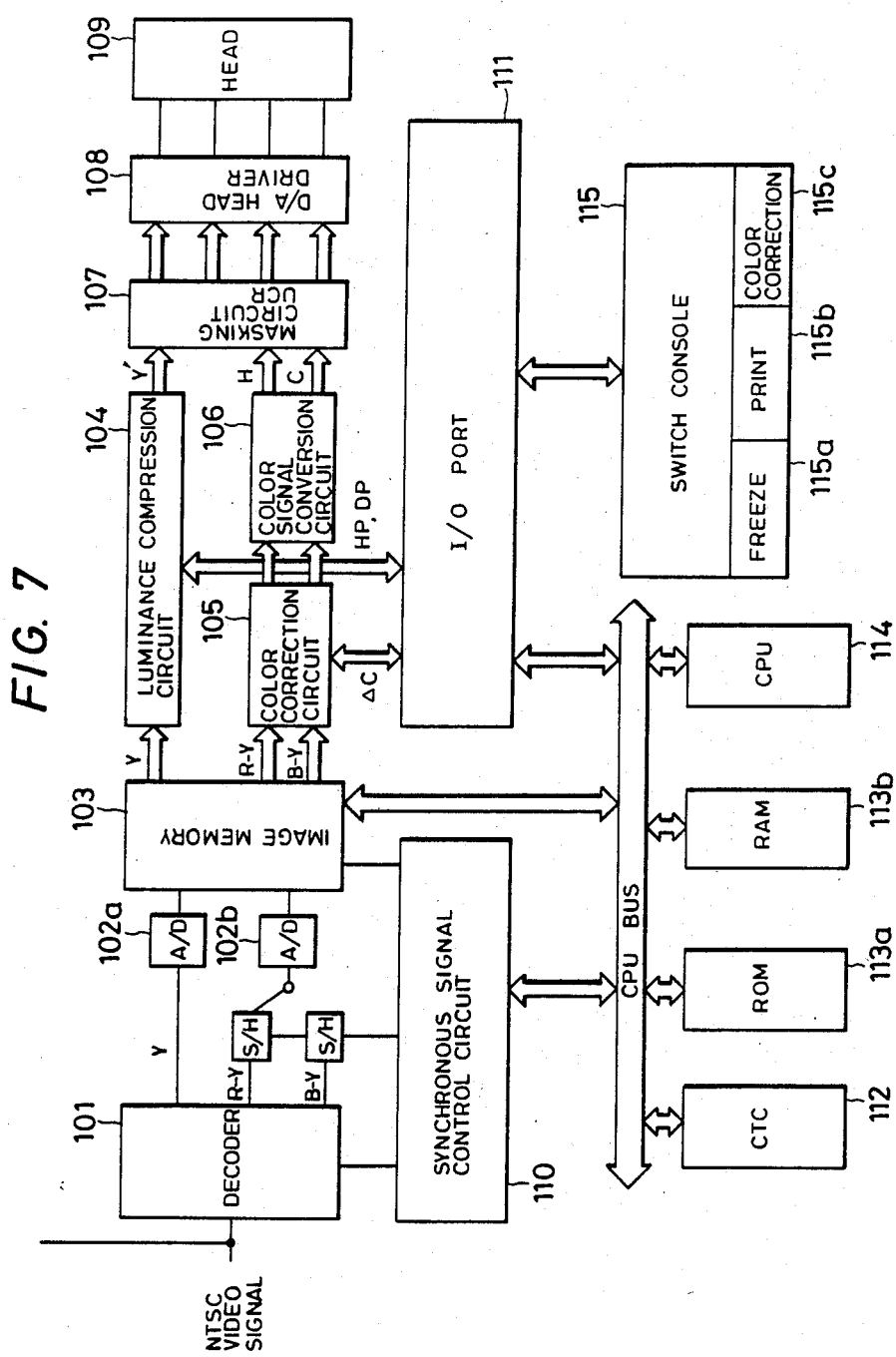
FIG. 7 is a block diagram showing the structure of an image processing section of a color recording device which is a second embodiment of this invention.

FIG. 7 shows a block diagram of a printer used in such embodiment. The apparatus of FIG. 7 receives an NTSC type video signal (employed in Japan and U.S.A.) and outputs a color image signal using a color recording head of a subtraction color mixing type such as an ink jet system.

In the particular embodiment, when a timing is designated by a predetermined switch (a freeze switch to be described later) on the switch console, the image at that time is recorded as a static image and output.

The received NTSC signal is demodulated by decoder circuit 101 into Y (luminance), R - Y, B - Y (color difference) signals.

As generally known, Y (luminance) signal represents brightness while R - Y, B - Y (color difference) signals represent saturation.

Y signal is converted by A/D converter 102A to a digital signal and stored in image memory 103. The R - Y, B - Y analog color difference signals for respective scanned lines are sequentially converted by A/D converter 102b to digital signals which are then input to image memory 103.

The inputting into image memory 103 is started in accordance with a synchronizing signal by designating timing using freeze switch 115a on the switch console. Synchronous-signal control circuit 110 is provided to synchronize the timings at which data is input to the video circuit side and the recording side.

Printing the input image data is started by turning on the printing switch on the switch console. Reading and outputting out of memory 103 are controlled by CPU 114 using ROM 113a and RAM 113b.

CPU 114 reads out of memory 103 Y data and color difference data for a place where printing is to be performed. Color difference data is obtained by line sequential scanning of a picture, so that linear interpolation is performed between adjacent scanning lines to produce R - Y, B - Y data. The data in a scanned line above or below the data between the adjacent scanned lines not scanned may be used as it is (so-called reuse) as the data between the adjacent scanned lines without interpolation.

The Y data output from memory 103 is input to luminance compression circuit 104 where the Y data is subjected to a gradation conversion. The circuit 104 can be realized by a conversion table which receives data on the highlight point HP and dark point DP and Y data in an image and outputs converted data Y'. HP and DP are designated by switch console 115.

This conversion implies that the dynamic range of video signals is compressed to a range in which video signals can be represented in ink without changing their saturation.

Figure 8:
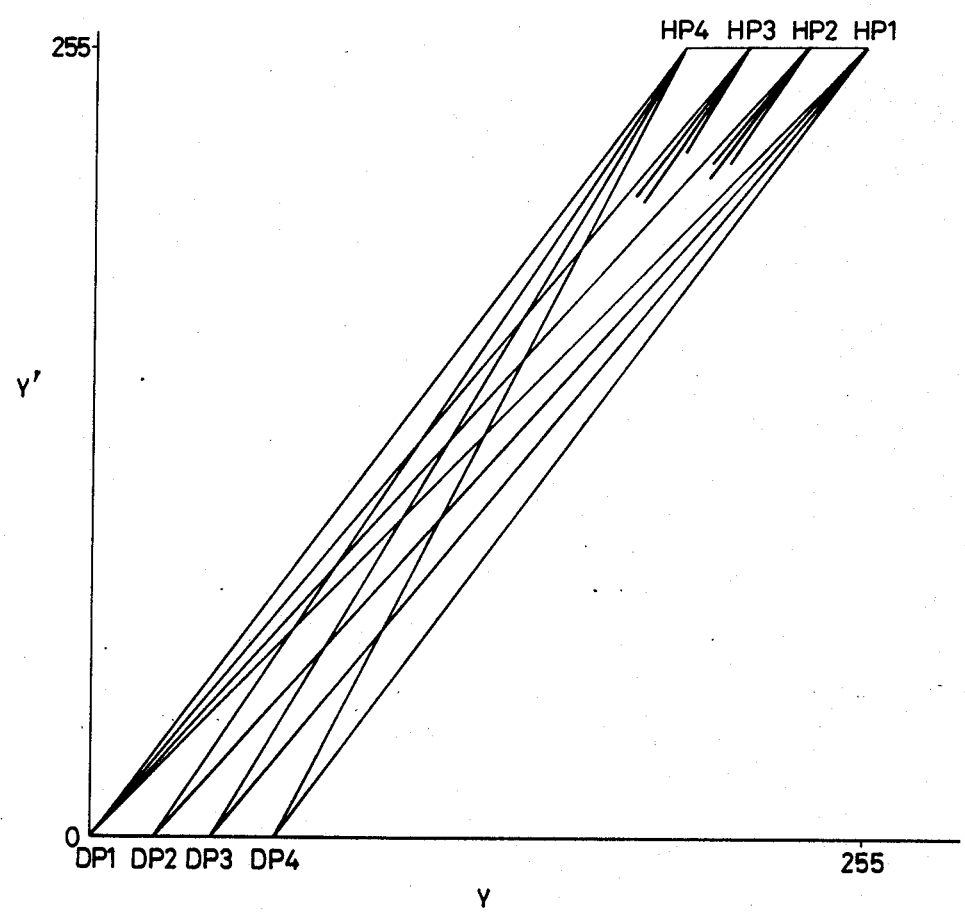
FIG. 8 is a diagram showing the compression characteristic of a color signal.

FIG. 8 shows conversion characteristic curves in the table wherein a total of 16 conversion characteristic curves, 4 stages for each of DP and HP, are shown.

While DP, HP are shown as being input from the switch console, they may automatically be found and input to luminance compression circuit 104 by scanning the Y signal memory and forming a histogram therefor after freeze switch 115a is turned on as in the previous embodiment.

Color correction circuit 105 will now be described in detail. This circuit functions to receive two-color difference signals R - Y, B - Y, corrects these signals and outputs two-color difference signals R - Y', B - Y'.

Color conversion circuit 106 generates hue signal H and saturation signal C from two color difference signals in accordance with the following formula:

$$H = \tan^{-1}\left(\frac{(B-Y)'}{(B-Y)}\right)(H = 0 \text{ when } (B-Y)' = 0)$$

$$C = \sqrt{((R-Y)')^2 + ((B-Y)')^2}$$

Color conversion circuit 106 can be realized by a table converter which outputs the data obtained by the above formulas in accordance with a combination of received color difference signals.

Masking, black generation circuit 107 receives the Y signal, and H, C signals obtained by the above conversion and converts these signals to four color density signals C'', M'', Y'' and BK (dark) used in real printing. The conversion is performed in accordance with the following formulas:

$$(R - Y)' = C \cdot \cos H$$

$$(B - Y)' = C \cdot \sin H$$

$$R' = Y' + (R - Y)'$$

$$G' = Y' - (0.3 \cdot (R-Y)' + 0.11 \cdot (B-Y)')/0.59$$

$$B' = Y' + (B - Y)'$$

$$C' = -\log R'$$

$$M' = -\log G'$$

$$Y' = -\log B'$$

$$BK = \text{Min}(C', M', Y')$$

In order to correct uneven color components of the ink used, the following matrix calculation is performed:

$$\begin{bmatrix} C'' \\ M'' \\ Y'' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} C' \\ M' \\ Y' \end{bmatrix}$$

Masking circuit 107 can be realized by a table converter which receives Y', H and C and outputs C'', M'', Y'', BK. The respective output signals C'', M'', Y'', BK are input to head driver circuit 108 and converted by a D/A converter to a drive pulse waveform for recording head 109 to thereby drive the same and perform printing.

Recording head 109 is composed of a color head of an ink jet type which records in four colors, namely, cyan, magenta, yellow and black.

The processing by color correction circuit 105 will now be described in more detail.

Generally, if the set color temperature does not coincide with the real color temperature of a subject, a color reproduction error appears in a chromaticity chart. This will actually be explained by taking an example. Assume that the color temperature of a light source illumining the subject is 4000° K.

Figure 9:
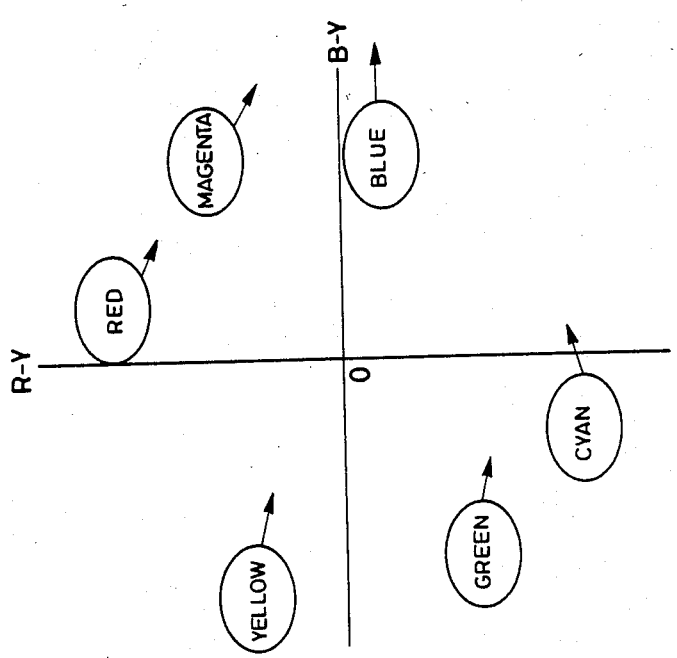

If the color temperature set at the camera is 4000° K., of course, a good color tone image can be obtained. However, if the color temperature is set at 3000° K. on the camera side and an image is picked up, excessive correction would be performed and the picked up image would actually be colored slightly blued. FIG. 9 shows such situation using a chromaticity diagram with R - Y and B - Y coordinate axes.

In contrast, assume that the color temperature is set at 5000° K. on the camera side and an image is picked up. In that case, correction is insufficient because the color temperature is considered higher than the actual one. This is shown in FIG. 10 comprising a chromaticity diagram with R - Y and B - Y coordinate axes.

Figure 10:
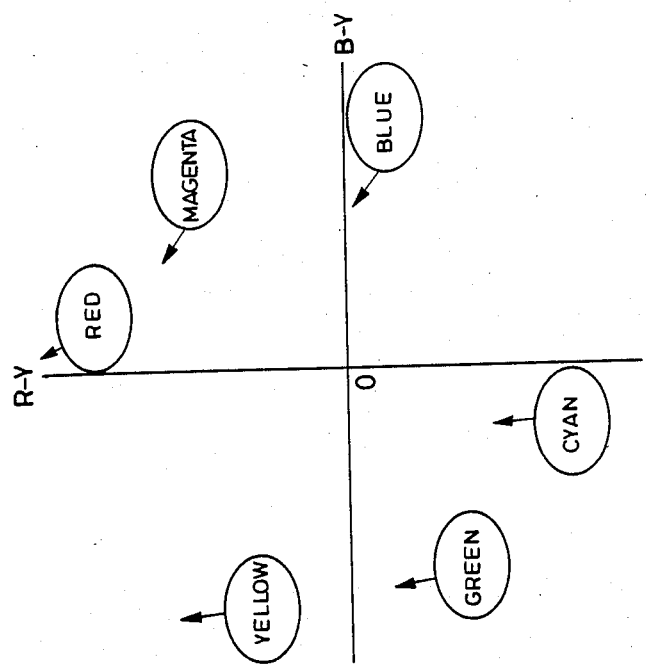
FIGS. 9 and 10 illustrate shifts of color data produced due to different set color temperatures.

As will be seen from FIGS. 9 and 10, a mistake in the color temperature setting is represented as a "shift" of the entire reproduced color in a direction in the color difference plane. Therefore, in order to correct a mistake in the color temperature setting, it will be understood that a color difference signal should be shifted by a correction quantity. The particular embodiment will be described as being executed by using table conversion.

A table converter which constitutes color correction circuit 105 receives two color difference signals R - Y, B - Y and a correction quantity $\Delta C$ input via I/O port 11 from switching console 15 and outputs corrected color difference signals R - Y', B - Y'. Here assume that the table converter includes three higher color temperature correction stages and three lower color temperatures correction stages. Namely, there are seven stages: $-3, -2, -1, 0, +1, +2, +3$ as $\Delta C$. The output signals are formed as follows:

$$(R - Y)' = R - Y + \alpha \cdot \Delta C$$

$$(B - Y)' = B - Y + \beta \cdot \Delta C$$

Namely, the two color difference signals are controlled by a single variable $\Delta C$. $\alpha, \beta$ are constants and can be set such that the respective steps are switched equally. A total of 12 bits comprising 8 bits for each of two input color difference signals and 3 bits for seven stages are required, so that the color correction circuit can be realized by a 32 K-ROM.

The correction input and correction will now be described. Color temperature correction switch 15c on switch console 115 produces a 3-bit digital signal as a correction quantity $\Delta C$ which is then output to I/O port 111. CPU 114 searches the state of I/O port 111 for each line printing, applies set position data to color correction circuit 105 to switch the conversion table to thereby perform correction.

According to the above structure, first, color difference signals are formed, and shifted on the basis of a predetermined correction quantity to thereby perform color correction, so that circuits (or software) required for this processing can be greatly simplified compared to a conventional circuit which corrects three primary color datas separately. Therefore, a color printer is realized which has an inexpensive structure to correct the color of an input image and to output a finished image.

While in the above an example which records and outputs a video signal of NTSC signal type is illustrated, other format image signals may be processed by changing the structure of the decoder.

While in the embodiments color correction is performed by table conversion, it may be performed by adding and/or subtracting a correction quantity using software.

As is clear from the above, the embodiments of this invention provide a color image recording apparatus for performing color recording on the basis of three input primary color signals comprising: means for generating a luminance signal and two color signals; a correction circuit for applying a quantity of shift to the generated color signals; means for generating from the luminance signal and color signals three primary color signals suitable for a color dissolving system of recording means; and means for receiving one correction value to correct the color difference signals whereby correction of the two color signals is controlled by the correction value. Therefore, the apparatus is simple and performs satisfactory color correction.

While in the particular embodiments color correction is performed in a system which handles color difference signals, this invention is not limited to it. For example, the colors of primary color signals such as R, B signals may be corrected by applying a quantity of shift to them.

While in the embodiments a recording device is described as an example, this invention is not limited to it. For example, this invention may be applicable to an apparatus and method which processes a color image.

What is claimed:

1. A color image processing method comprising the steps of:
   detecting a dark point in a color image;
   detecting a color component of the detected dark point;
   supplying a luminance signal other than that of the dark point; and
   correcting a color component other than that of the dark point in accordance with the luminance signal and the detected color component.

2. A color image processing method according to claim 1, wherein the color component other than the color component of the dark point is a signal represented by a color difference signal.

3. A color image processing method according to claim 2, further comprising the step of converting the color difference signal into a hue signal and a saturation signal.

4. A color image processing method according to claim 3, further comprising the step of outputting Y, M and C signals on the basis of the hue signal, saturation signal and luminance signal.

5. A color image processing method according to claim 4, further comprising the step of supplying the Y, M and C signals to a recording means.

6. A color image processing apparatus comprising:
   dark point detecting means for detecting a dark point in a color image;
   dark point color component detecting means for detecting a color component of the detected dark point;
   luminance signal supplying means for supplying a luminance signal other than that of the dark point; and
   correcting means for correcting a color component other than that of the dark point in accordance with the luminance signal and the detected color component.

7. A color image processing apparatus according to claim 6, wherein the color component other than the color component of the dark point is a signal represented by a color difference signal.

8. A color image processing apparatus according to claim 7, further comprising converting means for converting the color difference signal to a hue signal and a saturation signal.

9. A color image processing method according to claim 8, further comprising outputting means for outputting Y, M and C signals on the basis of the hue signal, saturation signal and luminance signal.

10. A color image processing apparatus according to claim 9, further comprising color signal supplying means for supplying the Y, M and C signals to a recording means.

11. A color image processing method comprising the steps of:
producing a plurality of types of color signals from a color image;
inputting one correction value to correct the plurality of color signals; and
correcting the plurality of types of color signals by shifting the level of the signals in accordance with the one correction value.

12. A color image processing method according to claim 11, wherein the plurality of color signals are two color difference signals.

13. A color image processing method according to claim 11, wherein the correcting step is a step of adding or subtracting a predetermined value to or from the plurality of types of color signals.

14. A color image processing method according to claim 12, wherein the two color difference signals are signals generated from primary color signals.

15. A color image processing apparatus comprising:
producing means for producing a plurality of types of color signals from a color image;
inputting means for inputting one correction value to correct the plurality of color signals; and
correcting means for correcting the plurality of types of color signals by shifting the level of the signals in accordance with the one correction value.

16. A color image processing apparatus according to claim 15, wherein the plurality of color signals are two color difference signals.

17. A color image processing apparatus according to claim 15, wherein said correcting means comprises means for adding or subtracting a predetermined value to or from the plurality of types of color signals.

18. A color image processing apparatus according to claim 16, wherein the two color difference signals are signals generated from primary color signals.

19. A color image processing method comprising the steps of:
detecting a dark point in a color image;
detecting a color component of the detected dark point;
detecting a highlight point in the color image;
detecting a color component of the detected highlight point; and
correcting a color component other than those of the dark point and highlight point in accordance with the detected color components.

20. A color image processing apparatus comprising:
dark point detecting means for detecting a dark point in a color image;
dark point color component detecting means for detecting a color component of the detected dark point;
highlight point detecting means for detecting a highlight point in the color image;
highlight point color component detecting means for detecting a color component of the detected highlight point; and
correcting means for correcting a color component other than those of the dark point and highlight point in accordance with the detected color components.

21. A color image processing method comprising the steps of:
producing a plurality of types of color signals from a color image;
inputting one correction value to correct the plurality of color signals;
correcting the plurality of types of color signals in accordance with the one correction value; and
recording the corrected color signals on a recording medium.

22. A color image processing method according to claim 21, wherein the plurality of color signals are two color difference signals.

23. A color image processing method according to claim 22, wherein the two color difference signals are signals generated from primary color signals.

24. A color image processing method according to claim 21, wherein the recording step is performed using an ink-jet system.

25. A color image processing apparatus comprising:
producing means for producing a plurality of types of color signals in a color image;
inputting means for inputting one correction value to correct the plurality of color signals;
correcting means for correcting the plurality of types of color signals in accordance with the one correction value; and
recording means for recording the corrected color signals on a recording medium subsequent to correction by said correcting means.

26. A color image processing apparatus according to claim 25, wherein the plurality of color signals are two color difference signals.

27. A color image processing apparatus according to claim 26, wherein the two color difference signals are signals generated from primary color signals.

28. A color image processing apparatus according to claim 25, wherein said recording means includes an ink-jet recording head.

* * * * *